United States Patent
Watson

[15] 3,666,159
[45] May 30, 1972

[54] CLAMPING MEANS FOR PIPES AND FITTINGS

[72] Inventor: Robert L. Watson, Box 295 RD #2, Lowellville, Ohio 44436

[22] Filed: July 15, 1969

[21] Appl. No.: 841,954

Related U.S. Application Data

[63] Continuation-in-part of Ser. No. 648,318, June 23, 1967, Pat. No. 3,467,295.

[52] U.S. Cl. ..................228/49, 29/200 P, 269/43
[51] Int. Cl. ..................................................B23k 1/14
[58] Field of Search ..................228/44, 47, 49; 217/158; 72/380; 29/200, 264; 269/43, 44, 45

[56] References Cited

UNITED STATES PATENTS

| | | |
|---|---|---|
| 2,102,259 | 12/1937 | Edwards et al..................219/158 X |
| 2,846,968 | 8/1958 | Tipton..................................113/102 |
| 3,284,883 | 11/1966 | Haverfield et al. ...................29/200 |
| 3,380,148 | 4/1968 | Nelson et al...........................29/464 |
| 3,422,519 | 1/1969 | Fehlman.................................29/200 |
| 3,467,295 | 9/1969 | Watson...................................228/49 |
| 3,527,398 | 9/1970 | Gersbacher.............................228/44 |
| 1,916,556 | 7/1933 | Butt.....................................269/43 X |

*Primary Examiner*—John F. Campbell
*Assistant Examiner*—R. J. Craig
*Attorney*—Webster B. Harpman

[57] ABSTRACT

A portable lightweight clamping device for securing two sections of pipe in end to end relation to facilitate welding of the sections to one another. The clamping means includes a plurality of arms which are clamped to one of the sections of pipe and which extend outwardly in spaced relation to the other piece of pipe and are provided with adjustable screws so that the second piece of pipe can be brought into proper alignment with the first section and welded while being so held.

4 Claims, 3 Drawing Figures

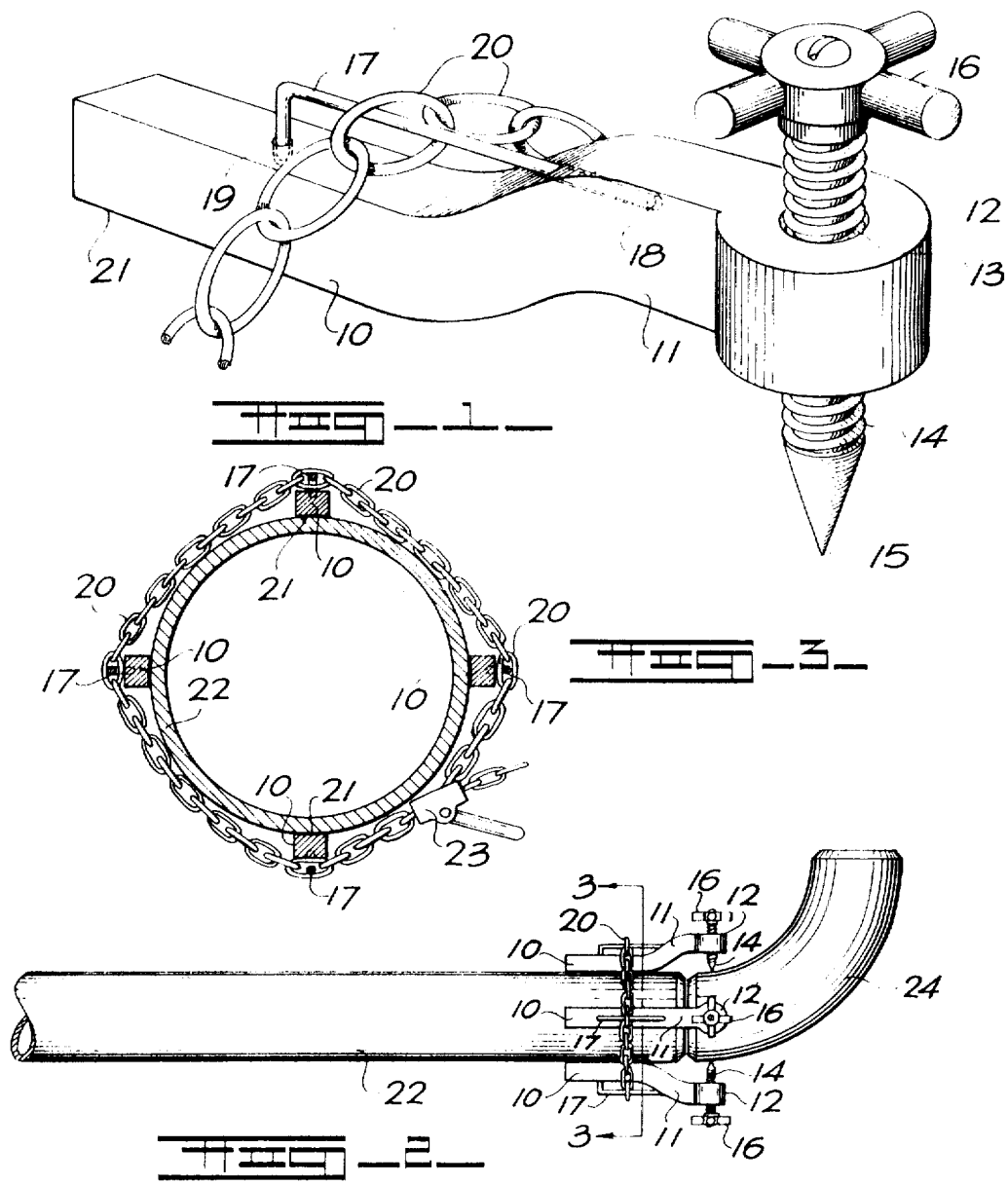

CLAMPING MEANS FOR PIPES AND FITTINGS

This application is a continuation-in-part of my application Ser. No. 648,318 filed June 23, 1967 and allowed Mar. 3, 1969 U.S. Pat. No. 3,467,295.

BACKGROUND OF THE INVENTION

1. Field of the Invention

This invention relates to clamping devices for holding objects in end to end alignment with one another.

2. Description of the Prior Art

Other than applicant's co-pending application no prior art devices are known that disclose a comparable lightweight portable and adjustable device for holding pipes for example, in end to end alignment with one another to facilitate the welding together thereof.

SUMMARY OF THE INVENTION

A clamping means for pipes and fittings comprises a plurality of arms adjustably positioned on a clamping chain and in spaced relation to one another so that they may be positioned in circumferential relation around the end of a pipe. Each of the arms is offset at one of its ends and each of the offset ends is provided with a right angular screw device so that a second piece of pipe may be positioned between the offset ends and the screw devices used to hold the second piece of pipe in end to end alignment with the piece carrying the arms.

DESCRIPTION OF THE DRAWINGS

FIG. 1 is a perspective view of one arm portion of a clamp incorporating several of the arm portions and used for securing one tubular member to another.

FIG. 2 is a side elevation of a section of pipe and a tubular fitting and clamping means holding the same in welding position.

FIG. 3 is an enlarged vertical section on line 3—3 of FIG. 2.

DESCRIPTION OF THE PREFERRED EMBODIMENT

In its simplest form the clamping means for pipes and fittings comprises a plurality of clamping arms 10 each of which has an offset end portion 11 which in turn has an enlarged circular end portion 12 thereon. A right angular drilled and tapped opening 13 is formed in the enlarged circular end portion 12 and a pointed bolt 14, the point of which is indicated at 15 is threadably engaged therein. The point bolt 14 has a handle 16 on the end thereof opposite the point 15 so that it can be rotated thereby. An L shaped fitting 17 formed of resilient wire or the like is slidably engaged at one it its ends in an elongated opening 18 in the offset end 11 of the clamping arm 10. The other end is removably positioned by reason of its resiliency in a depression 19 in the clamping arm 10.

A tensioning link chain 20 is partially illustrated in FIG. 1 of the drawings and with one of the links thereof engaged on the L shaped fitting 17.

By referring to FIG. 3 of the drawings, it will be observed that the one surface of the clamping arm 10 is arcuate as shown at 21 so that it will conform somewhat to the circumference of a section of pipe 22.

In FIG. 2 of the drawings the section of pipe 22 is seen in side elevation and by referring to FIGS. 2 and 3 of the drawings, it will be seen that four of the clamping arms 10, all of which are interconnected by the tension chain 20 are circumferentially spaced around the section of pipe 22 and tightly held thereon by a binder clamp 23 which acts to tension chain 20 as will be understood by those skilled in the art.

It will occur to those skilled in the art that different diameters of pipe can be accommodated by the device by simply opening the L shaped fittings 17 and repositioning the clamping arm 10 along the tension chain 20 so that the clamping arms are evenly disposed around the outer diameter of the pipe on which they are to be temporarily secured. When they are so secured, the pointed bolts 14 are retracted and the second section of pipe whether straight or an L shaped fitting such as indicated at 24 in the drawings, is positioned in end to end alignment with the first section of pipe and the pointed bolts 14 rotated by the handle 16 until the points 15 engage and position the fitting 24 in the exact position desired for welding it to the first section of pipe. When the clamping device is so secured to the two pieces of pipe they will be held firmly while a subsequent welding operation is performed and once the welding operation is completed the binder clamp 23 is loosened, the tension chain 20 disengaged therefrom and the device removed to another location for a subsequent operation. It will be observed that the offset end portions 11 of each of the clamping arms 10 provides sufficient operating room for the pointed screws 14 and that this same degree of adjusting and operating room will be present regardless of the diameter of the pipe on which the device is positioned.

Althought but one embodiment of the present invention has been illustrated and described, it will be apparent to those skilled in the art that various changes and modifications may be made therein without departing from the spirit of the invention and having thus disclosed my invention what I claim is:

1. A clamping device for holding a pipe and a fitting in temporary alignment and comprising a plurality of clamping arms each of which has an offset apertured end portion, a flexible member loosely attached to each of said plurality of clamping arms and of a length to encircle said pipe and said clamping arms when positioned thereabout and means for tensioning said flexible member, pointed bolts in said offset ends of said clamping arms for selectively engaging said fitting.

2. The clamping device set forth in claim 1 and wherein the flexible member comprises a chain encircling said pipe and portions of said clamping arms and a binder clamp adjustably joining the ends of said chain, movable fittings on each of said clamping arms engaging spaced links in said chain for securing said clamping device in a portable assembly.

3. The clamping device set forth in claim 1 and wherein the aperture in the offset end portions of the clamping arms are threaded and the pointed bolts are positioned through the threaded apertures in perpendicular relationship to said offset end portions.

4. The clamping device set forth in claim 1 and wherein the offset end portion extend substantially inwardly of the ends of the clamping arms.

* * * * *